United States Patent
Kraemer et al.

(10) Patent No.: US 10,161,333 B2
(45) Date of Patent: Dec. 25, 2018

(54) CONTROLLING AN INTERNAL COMBUSTION ENGINE

(71) Applicant: GM GLOBAL TECHNOLOGY OPERATIONS LLC, Detroit, MI (US)

(72) Inventors: Felix Kraemer, Ruesselsheim (DE); Nihad Karacic, Ruesselsheim (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/492,809

(22) Filed: Apr. 20, 2017

(65) Prior Publication Data
US 2017/0306873 A1   Oct. 26, 2017

(30) Foreign Application Priority Data
Apr. 21, 2016 (DE) .................. 10 2016 004 820

(51) Int. Cl.
| F02D 41/02 | (2006.01) |
| F02D 13/02 | (2006.01) |
| F02D 41/26 | (2006.01) |
| F02D 41/14 | (2006.01) |
| F02D 41/00 | (2006.01) |

(52) U.S. Cl.
CPC ..... F02D 41/0295 (2013.01); F02D 13/0261 (2013.01); F02D 41/1456 (2013.01); F02D 41/26 (2013.01); F02D 2041/001 (2013.01); F02D 2200/0814 (2013.01); F02D 2250/36 (2013.01)

(58) Field of Classification Search
CPC .. F02D 13/02; F02D 13/0261; F02D 13/0265; F02D 13/0269; F02D 41/02; F02D 41/0295; F02D 41/26; F02D 2200/0814; F01N 3/2006; F01N 3/206; F01N 9/005; F01N 9/007; F01N 11/00; F01N 13/001; F01N 2430/06; F01N 2430/08; F01N 2430/085
USPC ............ 701/102–105, 109, 114, 115; 60/274–278
See application file for complete search history.

(56) References Cited

U.S. PATENT DOCUMENTS

| 5,398,502 A * | 3/1995 | Watanabe ........... F01L 13/0015 123/90.15 |
| 8,464,514 B2 * | 6/2013 | Kerns ................. F02D 41/0007 60/274 |

(Continued)

FOREIGN PATENT DOCUMENTS

DE   102014001672 A1   8/2015

OTHER PUBLICATIONS

German Patent Office, German Search Report for German Application No. 102016004820.4, dated Nov. 18, 2016.

*Primary Examiner* — John Kwon
*Assistant Examiner* — Johnny H Hoang
(74) *Attorney, Agent, or Firm* — Lorenz & Kopf, LLP

(57) ABSTRACT

A method and device for controlling a supercharged internal combustion engine is disclosed. An oxygen charge of a catalytic converter of the internal combustion engine is determined. A valve overlap of the internal combustion engine is increased from a lower valve overlap value to an upper valve overlap value. Increasing the valve overlap and/or for at least one phase of the increase, a control value for increasing an air-fuel ratio in at least one cylinder of the internal combustion engine is reduced as a function of the determined oxygen charge.

15 Claims, 1 Drawing Sheet

(56) References Cited

U.S. PATENT DOCUMENTS

| | | | | |
|---|---|---|---|---|
| 8,495,865 B2* | 7/2013 | Okada | ............... | F02D 13/0257 |
| | | | | 123/90.15 |
| 9,399,944 B2* | 7/2016 | Tsuyuki | ............. | F02D 41/0007 |
| 9,506,397 B2* | 11/2016 | Karnik | .................. | F02B 37/18 |
| 9,695,755 B2* | 7/2017 | Glugla | ................. | F02B 37/168 |
| 9,890,694 B2* | 2/2018 | Kondo | .................. | F02B 29/06 |
| 2011/0231079 A1* | 9/2011 | Arlt | ................... | F02D 41/0235 |
| | | | | 701/103 |
| 2012/0226424 A1* | 9/2012 | Adams | ..................... | F01N 3/20 |
| | | | | 701/93 |
| 2017/0167419 A1* | 6/2017 | Azadeh | .............. | F02D 41/0295 |

* cited by examiner

CONTROLLING AN INTERNAL COMBUSTION ENGINE

CROSS-REFERENCE TO RELATED APPLICATION

This application claims priority to German Patent Application No. 102016004820.4, filed Apr. 21, 2016, which is incorporated herein by reference in its entirety.

TECHNICAL FIELD

The present disclosure pertains to a method and to a control for controlling an internal combustion engine, in particular of a motor vehicle, to a motor vehicle, in particular a passenger car with the control and to a computer program product for carrying out the method.

BACKGROUND

It is generally known that an internal combustion engine for motor vehicles is equipped with a catalytic converter for emission control. It is also known such engines may also be provided with variable valve overlap between inlet and exhaust valves. By temporarily increasing the valve overlap, a performance of the internal combustion engine can be increased if required.

In the process, an oxygen quantity in the exhaust gas and thus in the catalytic converter can increase in particular through the temporary increasing of the valve overlap. However, when an oxygen quantity in the catalytic converter is too high, a reduction of nitrogen oxides ($NO_x$) in the catalytic converter can deteriorate when a corresponding oxygen quantity is already present or stored in the catalytic converter. According there is a need to improve an internal combustion engine to address this issue.

SUMMARY

According to an embodiment of the present disclosure, an internal combustion engine of a vehicle having at least one catalytic converter for emission control. The internal combustion engine may be an Otto or diesel engine, and may be a (pressure) supercharged internal combustion engine which includes at least one exhaust gas turbocharger. The catalytic converter can be configured or equipped for reducing nitrogen oxides ($NO_x$) in the exhaust gas of the internal combustion engine. In a further development, the catalytic converter can be a multi-way catalytic converter for reducing carbon monoxide (CO) and/or hydrocarbons ($H_mC_n$). Additionally or alternatively, the catalytic converter can, in an embodiment, be a regulated catalytic converter including a lambda control. With such applications or embodiments, the present disclosure can improve an operation of the internal combustion engine, and in particular the emission control.

According to an embodiment of the present disclosure, a method for controlling the internal combustion engine in which an oxygen charge of the catalytic converter is determined and a valve overlap of the internal combustion engine is increased from a lower valve overlap value to a higher valve overlap value. A valve overlap may include or be a period or phase, in which both one or more inlet valves of one or more cylinders of the internal combustion engine as well as (in each case) one or more exhaust valves of the same cylinder(s) are opened, in particular a so-called scavenging.

Through an increased valve overlap, a performance of the internal combustion engine, in an embodiment, can be temporarily improved, in particular for accelerating the motor vehicle from a lower rotational speed range of the internal combustion engine.

According to an embodiment of the present disclosure, the valve overlap increase is reduced as a function of the determined oxygen charge. By reducing, the valve overlap increase as a function of the determined oxygen charge of the catalytic converter, a deterioration of a reduction of nitrogen oxides with already correspondingly oxygen-charge catalytic converter can be counteracted as a consequence of the valve overlap increase and the increase of the oxygen quantity in the catalytic converter resulting therefrom, and thus an operation of the internal combustion engine, in particular its emission control, is improved, particularly in periods with increasing or increased valve overlap.

According to an embodiment of the present disclosure, a current ratio or a current quotient of air (volume or mass) to or divided by fuel (volume or mass), in particular a ratio or quotient of a current ratio or quotient of air (volume or mass) to or divided by fuel (volume or mass) to or divided by a stoichiometric ratio or a stoichiometric quotient of air (volume or mass) to or divided by fuel (volume or mass), which here (in each case) is described in particular as an air-fuel ratio, in at least one, and preferably all, cylinders of the internal combustion engine in an air-fuel supply of the internal combustion engine, or at least one (first) control value for increasing the air-fuel ratio for at least one phase of the valve overlap increase from a lower valve overlap value to an upper valve overlap value is reduced as a function of the determined oxygen charge, in particular as a function or because of the increasing or triggered by the increasing, in particular with a commencement of the valve overlap increase or by a variable, predetermined period of time before or after the commencement of the valve overlap increase.

An air-fuel ratio can thus be an inverted value of a so-called equivalence ratio (EQR) in an embodiment, which accordingly is defined as ratio or quotient of a current ratio or quotient of fuel (volume or mass) to or divided by air (volume or mass) to or divided by a stoichiometric ratio or a stoichiometric quotient of fuel (volume or mass) to or divided by air (volume or mass). Accordingly, in an embodiment of the present disclosure, an equivalence ratio (EQR) is increased in at least one, and preferably all cylinders of the internal combustion engine in an air-fuel supply of the internal combustion engine, or at least one EQR control value for increasing an or the equivalence or EQR ratio for at least one phase of the valve overlap increase, which is increased from the lower valve overlap value to the upper valve overlap value as a function of the determined oxygen charge, in particular as a function or because of or triggered by the increase, in particular with a commencement of the increase or by a variable, predetermined period of time before or after the commencement of the valve overlap increase.

In that, in an embodiment, the air-fuel ratio or the first control value, in particular because of or triggered by the increase of the valve overlap, for at least one phase of the increase as a function of the determined oxygen charge is reduced or conversely the equivalence or EQR ratio or the EQR control value, in particular triggered because of or through the valve overlap increase, is increased for at least one phase of the valve overlap increase as a function of the determined oxygen charge, a deterioration of a reduction of nitrogen oxides with already correspondingly oxygen-charged catalytic converter can be counteracted by or as a consequence of the (if applicable further) increasing the valve overlap and the increase of the oxygen quantity in the catalytic converter resulting from this and thus an operation of an internal combustion engine, in particular emission control may be improved, in particular in periods with increasing or increased valve overlap.

In that the air-fuel ratio or the first control value in an embodiment is already reduced (or the EQR ratio or the EQR value increase) by a predetermined period of time prior to the commencement of increasing of the valve overlap, the reduced air-fuel ratio or the reduced first control value (or the increased EQR ratio or the increased EQR control value) in an embodiment can be present even at the commencement of increasing of the valve overlap, and thus a deterioration of a reduction of nitrogen oxides may be already early or preventatively counteracted, in particular the increasing of the valve overlap with reduced air-fuel ratio (or increased EQR ratio) be initiated or commenced. To this end, a time window, in an embodiment, in particular between a presence or detection of a condition for increasing the valve overlap, for example an increased load demand on the internal combustion engine, and an initiation or implementation of the increasing can be utilized for initiating the reduction of the air-fuel ratio.

In that the air-fuel ratio or the first control value in an embodiment upon commencement or by a predetermined period of time following the commencement of the increasing of the valve overlap is reduced (or the EQR ratio or the EQR control value increased), the actually commenced increasing of the valve overlap can be reacted to with the reduced air-fuel ratio or first control value (or the increased EQR ratio or EQR control value) and thus a deterioration or reduction of nitrogen oxides specifically and/or reliably counteracted. By a variable or adjustable period of time, the control can in each case be adapted to different peripheral conditions.

The valve overlap can be changed through a variable valve control, in particular a camshaft adjuster of the internal combustion engine, in particular increased from the lower valve overlap value to the upper valve overlap value. Accordingly, the internal combustion engine includes a variable valve control, in particular a camshaft adjuster for the in particular temporary increasing of the valve overlap of the internal combustion engine.

The lower valve overlap value or upper valve overlap value is (in each case) proportional to the overlap (of the opening times) of inlet and exhaust valve(s), in particular to an adjusting angle of the camshaft adjuster (increasing the overlap of the opening times), it can indicate this (these), for example in [deg] [rat] [%] or the like. A larger valve overlap value corresponds to a greater or longer valve overlap.

In an embodiment, the lower valve overlap value is a current valve overlap value. The upper valve overlap value is a predetermined or set or target valve overlap value, which may be preset in a further development by a control of the internal combustion engine, in particular as a function of a rotational speed, load and/or load demand of the internal combustion engine for the temporary performance increase of the internal combustion engine.

The phase of the valve overlap increase for which the air-fuel ratio or the first control value is reduced (or the EQR ratio or the EQR control value increased), the complete increasing of the valve overlap include or be the complete increasing of the valve overlap from the lower to the reaching of the upper valve overlap value. As a result, an emission control of the internal combustion engine can be further improved in an embodiment.

In another embodiment, the phase of the increasing of the valve overlap, for which the air-fuel ratio or the first control value is reduced (or the EQR ratio or the EQR control value increased), includes only a part of the increasing of the valve overlap from the lower to the (reaching of the) upper valve overlap value. As a result, an operation of the internal combustion engine, in particular an in particular temporary performance increase by increasing the valve overlap can be improved in an embodiment.

In an embodiment, the phase includes commencement of increasing or the lower valve overlap value. Additionally or alternatively, the phase includes the end of the increasing or the upper valve overlap value or reaching the upper valve overlap value. As a result, an emission control and/or performance increase of the internal combustion engine, in particular together, can be improved.

In an embodiment, the increasing of the valve overlap can be reduced in that the upper valve overlap value itself is reduced. As a result, an emission control of the internal combustion engine can be improved in an embodiment.

Additionally or alternatively, increasing of the valve overlap can be reduced in that a rate of increase is reduced; in particular a time lag pending the reaching of the upper valve overlap value is increased, in a further development by slowing down the camshaft adjuster, in particular corresponding modifying of a control ramp. As a result, an emission control and simultaneously a performance increase of the internal combustion engine can be improved in an embodiment.

In an embodiment, the internal combustion engine is controlled in such a manner that for or with a first determined oxygen charge of the catalytic converter or a first determined charge value of the oxygen charge, the upper valve overlap value includes a first overlap value, and/or the first control value, in particular the air-fuel ratio, for the phase of increasing, in particular maximally and/or on average or in the mean, may include a first, in particular maximal or mean ratio control value. A rate of increasing, in particular from the lower and/or up to the upper valve overlap value, in particular maximally and/or on average or in the mean includes a first, in particular maximal or mean rate value. For or with at least one second determined oxygen charge of the catalytic converter or a second determined charge value of the oxygen charge, which is greater than the first oxygen charge or which is greater than the first charge value, the upper valve overlap value may include a second overlap value that is smaller than the first overlap value. The first control value, in particular the air-fuel ratio, for the phase, in particular maximally and/or on average or in the mean may include a second in particular maximal or mean ratio (control) value that is smaller than the first ratio (control) value. The rate of the increasing, in particular maximally and/or on average or in the mean, may include a second, in particular maximal mean rate value that is smaller than the first rate value.

In an embodiment, the reduction of the upper valve overlap value and/or of the (first) control value of the air-fuel ratio, and/or of the rate of the increasing is in particular directly or linearly proportion to the determined oxygen charge. In particular when the internal combustion engine is controlled in such a manner that for or with (at least) one third determined oxygen charge of the catalytic converter or an or a third determined (charge) value of the oxygen charge, which is greater than the second oxygen charge or which is greater than the second charge value, the upper overlap value may include third overlap value that is smaller than the second overlap value. The (first) control value, in particular the air-fuel ratio, for the phase, in particular maximally and/or on average or in the mean, may include a third in particular maximal or mean ratio (control) value that is smaller than the second ratio (control value). The rate of the increasing, in particular maximally and/or on average or in the mean, may include a third in particular maximal or mean (rate) value that is smaller than the second rate value. As a result, an operation of the internal combustion engine, in particular its emission (control) can be further improved in an embodiment, in particular more finely matched or adapted to different peripheral conditions.

Equally, a discrete changing over between at least one first and second overlap ratio (control) or rate value upon reaching (in each case) of a limit value can take place. In particular, the internal combustion engine in an embodiment is controlled in such a manner that the upper valve overlap value may include a first overlap value. The (first) control value, in particular the air-fuel ratio, for the phase of the increasing, in particular maximally and/or on average or in the mean, may include a first, in particular maximal or mean ratio (control) value. A rate of increasing, in particular from the lower and/or to the upper valve overlap value, in particular maximally and/or on average or in the mean, may include a first in particular maximal or mean (rate) value. In the case that the determined oxygen charge or the determined charge value of the oxygen charge does not exceed a variable, preset limit value, and/or the upper valve overlap value has a second overlap value that is smaller than the first overlap value, and/or the (first) control value, in particular the air-fuel ratio, for the phase, in particular maximally and/or on average or in the mean, has an in particular maximal or mean ratio (control) value that is smaller than the first ratio (control) value, and/or the rate of increasing, in particular maximally and/or on average or in the mean, has a second in particular maximal or mean (rate) value that is smaller than the first rate value, in the case that the determined oxygen charge exceeds the limit value. As a result, the control can be simplified in an embodiment. Here, the control, in an embodiment, can be adapted to different peripheral conditions through a variable or adjustable limit value.

In an embodiment, the internal combustion engine is controlled in such a manner that the reduced (first) control value, in particular the reduced air-fuel ratio, is (again) increased at least after, in particular already before reaching the upper valve overlap value, and/or as a function of a current valve overlap, in particular upon or because of a reaching of an in particular variable, preset valve overlap value, and/or as a function of a current period of time of increasing, in particular upon or because of an expiration of an in particular variable preset period of time of the increasing. By increasing the reduced (first) control value or air-fuel ratio following the reaching of the upper valve overlap value at the latest, an operation of the internal combustion engine can be further improved in particular a desired lean operation be realized. By increasing the reduced (first) control value or fuel-air ratio even before reaching the upper valve overlap value, a lean operation in an embodiment can be realized in a more timely manner. By increasing as a function of a current valve overlap, in particular upon reaching a preset valve overlap value, and/or as a function of a current period of time of increasing, in particular upon expiration of a preset period of time, in particular since the commencement of the increasing, the temporary reduction during the increasing can be limited in an embodiment.

Through a variable or adjustable valve overlap value or period of time, the control can be adapted to different peripheral conditions in this case.

In an embodiment, the increasing of the valve overlap in particular the upper valve overlap value and/or the rate of the increasing, and/or the (first) control value, in particular the air-fuel ratio can be reduced for the phase by an in particular variable preset value or offset. As a result, the control can be simplified in an embodiment. Through a variable or adjustable offset, the control, in an embodiment, can be adapted to different peripheral conditions here.

An oxygen charge of the catalytic converter rises in an embodiment with the volume or mass of the oxygen that is present in the catalytic converter. A greater oxygen charge or a greater charge value corresponds, in an embodiment, in particular to a greater volume or mass on oxygen that is present or available in the catalytic converter.

In an embodiment, the oxygen charge or the charge value is determined by one or more sensors. At least one sensor can be arranged downstream of the catalytic converter and/or at least one lambda probe, in particular at least one lambda jump and/or at least one lambda broadband probe.

By way of one or more sensors, the oxygen charge can be precisely determined. By arrangement downstream of the catalytic converter, oxygen storage in the catalytic converter can also be taken into account in an embodiment. By using a lambda probe, the same can be additionally used in a lambda control in an embodiment or conversely a lambda probe of a lambda control can assume an additional functionality. By way of a lambda jump probe, the oxygen charge can be reliably and/or easily determined. By way of a lambda broadband probe, the oxygen charge can be precisely and/or over a wider range.

In addition or alternatively the oxygen charge or the charge value is determined as a function of a duration of an in particular unfired and/or in particular directly preceding overrunning operation of the internal combustion engine. As a result, the oxygen charge in an embodiment can be estimated on the basis of a model, in which the longer an unfired overrunning operation of the internal combustion engine persists the higher is or will be the oxygen charge of its catalytic converter in an embodiment.

In an embodiment, the reducing of the (first) control value can include an increase of a fuel control value for increasing a fuel supply, in particular the reducing of the air-fuel ratio can include an increase of a fuel supply, in particular the first (control value) or the air-fuel ratio for the phase of the increasing of the valve overlap by increasing a fuel control value or a fuel supply to at least one, and preferably all cylinders of the internal combustion engine can be realized or for at least one phase of increasing of the valve overlap (a fuel control value for increasing) a fuel supply to at least one, and preferably all cylinders of the internal combustion engine can be increased as a function of the determined oxygen charge.

Additionally or alternatively, reducing of the (first) control value may include, a reduction of an air control value increasing an air supply, in particular reducing of the air-fuel ratio include a reduction of an air supply, in particular the first (control value) or the air-fuel ratio for the phase of the increasing of the valve overlap can be realized through reducing an air control value or an air supply to at least one, preferably all cylinders of the internal combustion engine or for at least one phase of increasing of the valve overlap (an air control value for increasing) and air supply to at least one, preferably all cylinders of the internal combustion engine be reduced as a function of the determined oxygen charge.

By way of increasing a fuel control value or a fuel supply, the air-fuel ratio can be easily, quickly and/or precisely reduced. By reducing an air control value or an air supply, a fuel consumption can be reduced in an embodiment.

In an embodiment, the (first) control value for increasing an air-fuel ratio can be a constant pre-control value, in particular of a lambda control of the catalytic converter. In particular, a total control value for increasing an air-fuel ratio can include the (first) control value, in particular be the same or contain the same additively or in the form of an increasing factor, in particular additively to or multiplied by a further control value for the air-fuel ratio, which results from a lambda control of the catalytic converter, of a load demand or engine control of the internal combustion engine or the like. In particular, a reducing of the (first) control value can bring about a constant (negative) offset of a total control value for increasing an air-fuel ratio.

In an embodiment, a greater (first or total) control value corresponds to a greater (commanded) air-fuel ratio, a greater fuel control value accordingly to a greater (commanded) fuel supply and a greater air control value accordingly to a greater (commanded) air supply. In other words, an increasing or increase of a (first or total) control value commands an increasing of an air-fuel ratio, an increasing or increase of a fuel control value accordingly an increasing of a fuel supply and an increasing or increase of a an air value corresponding to an increasing of an air supply.

As explained above, a reduction of a control value for increasing an air-fuel ratio can be replaced by an increasing of an EQR control value for increasing an EQR ratio in one or more in particular all cylinders of the internal combustion engine.

According to an embodiment of the present disclosure, a control for controlling the internal combustion engine in terms of hardware and/or software such as program may be configured as a control device to determine an oxygen charge of a catalytic converter of the internal combustion engine and increase a valve overlap of the internal combustion engine from a lower valve overlap value to an upper valve overlap value, as well as reduce the increasing of the valve overlap as a function of the determine oxygen charge. The control device may also be configured to reduce a (first) control value for increasing an air-fuel ratio, in particular for reducing an air-fuel ratio, in at least one cylinder of the internal combustion engine for at least one phase of the increasing of the valve overlap as a function of the determined oxygen charge.

In an embodiment, the control device may be configured to control the internal combustion engine in such a manner that for a first determined oxygen charge, the upper valve overlap value has a first overlap value and/or the (first) control value, in particular the air-fuel ratio, for the phase has a first ratio (control) value and/or a rate of increasing a first ratio value. For a second determined oxygen charge, which is greater than the first determined oxygen charge, the upper valve overlap value has a second overlap value, which is smaller than the first overlap value, and/or the (first) control value, in particular the air-fuel ratio for the phase has a second ratio (control value) which is smaller than the first ratio (control) value, and/or the rate of increasing has a second which is smaller than the first rate value.

In an embodiment, the control device may be configured to reduce the upper valve overlap value and/or the (first) control value, in particular the air-fuel ratio, and/or the rate of the increasing, in particular directly or linearly proportion to the determined oxygen charge.

In an embodiment, the control device may be configured to control the internal combustion engine in such a manner that for or with (at least) one third determined oxygen charge of the catalytic converter or a third determined charge value of the oxygen charge, which is greater than the second oxygen charge or which is greater than the second charge value, the upper valve overlap value includes a third overlap value, which is smaller than the second overlap value, and/or the (first) control value, in particular the air-fuel ratio, for the phase, in particular maximally and/or on average or in the mean, includes a third in particular maximal or mean ratio (control) value that is smaller than the second ratio (control) value, and/or the rate of the increasing, in particular maximally and/or on average or in the mean, includes a third in particular maximal or mean rate value that is smaller than the second rate value.

In an embodiment, the control device is configured for discrete changing over between at least one first and second overlap ratio (control) or rate value upon reaching a limit value (each).

In an embodiment, the control device is configured to control the internal combustion engine in such a manner that the upper valve overlap value includes a first overlap value and/or the (first) control value, in particular the air-fuel ratio, for the phase of a first ratio (control) value and/or a rate of the increasing a first rate value, in the case that the determined oxygen charge does not exceed a preset limit value, and the upper valve overlap value has a second overlap value that is smaller than the first overlap value, and/or the (first) control value, in particular the air-fuel ratio, for the phase has a second ratio (control) value that is smaller than the first ratio (control) value, and/or the rate of the increasing includes a second rate value which is smaller than the first rate value in the case that the determined oxygen charge exceeds the limit value.

In an embodiment, the control device is configured to increase the reduced (first) control value, in particular the reduced air-fuel ratio at least after, in particular even before reaching the upper valve overlap value, and/or as a function of a current valve overlap, in particular upon reaching an in particular variable preset valve overlap value, and/or as a function of a current period of time of the increasing, in particular upon expiration of an in particular variable preset period of time of the increasing.

In an embodiment, the control device is configured to reduce the increasing of the valve overlap and/or of the (first) control value, in particular of the air-fuel ratio, by an in particular variable preset value.

In an embodiment, the control device is configured to determine the oxygen charge by at least one sensor and/or as a function of a duration of an in particular unfired overrunning operation of the internal combustion engine. In a further development, the sensor is arranged downstream of the catalytic converter and/or includes at least one lambda probe, in particular at least one lambda jump and/or at least one lambda broadband probe.

In an embodiment, the control device is configured to increase a fuel control value, in particular of a fuel supply, and/or reducing an air control value, in particular of an air supply, for reducing the (first) control value or air-fuel ratio.

The control device in terms of the present disclosure can be in the form of hardware and/or software, in particular include an in particular digital processing in particular microprocessor unit (CPU) that is preferentially data or signal connected to a storage and/or bus system and/or include one or more programs or program modules. The CPU can be configured in order to execute commands which are implemented as a program stored in a storage system, detect input signals from a data bus and/or emit output signals to a data bus. A storage system can include one or more in particular various storage media, in particular optical, magnetic, solid body and/or other non-volatile media. The program can be of such a type that it embodies or is capable to carry out the methods described here so that the CPU can execute the steps of such methods and thereby control in particular an internal combustion engine. In an embodiment, the methods described above are carried out completely or partly in an automated manner, in particular by the control device.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
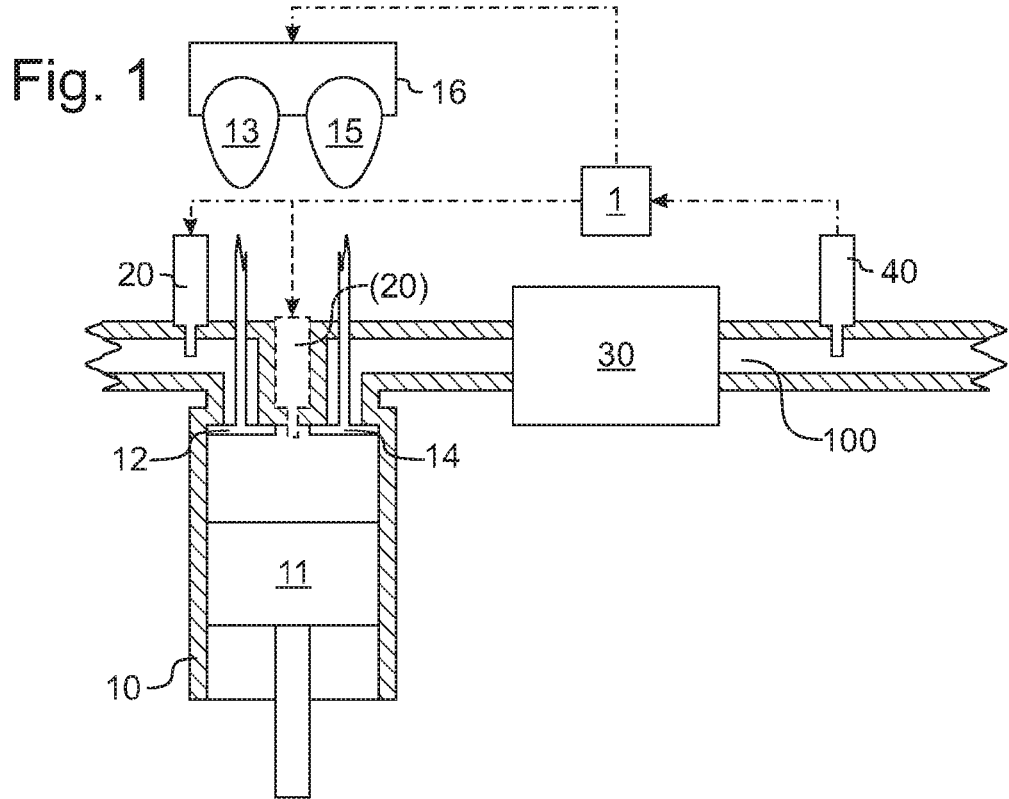
FIG. 1 illustrates a part of an internal combustion engine according to the present disclosure.

FIG. 1 shows a portion of an internal combustion engine according to the present disclosure. The engine includes a plurality of cylinders of same design or function, of which in FIG. 1 a cylinder 10 is exemplarily shown, wherein with respect to the other cylinders reference is made to the description of the former. In the cylinder 10, a piston 11 operates in the manner known per se. Through (at least) one inlet valve 12, in particular an intake gas (e.g. fresh air) can be fed to the cylinder 10, through (at least) one exhaust valve 14, exhaust gas from the cylinder 10 can be discharged into an exhaust passage 100, in which a three-way catalytic converter 30 is arranged downstream of the exhaust valve(s) 14.

In the exemplary embodiment, a fuel supply 20 is arranged upstream of or in front of the inlet valve(s) 12. Sensor 40 in the form of a lambda jump or broadband and probe is located upstream of catalytic converter 30. In a modification shown in interrupted lines, the fuel supply 20 can also be arranged in the cylinder or the cylinders 10.

The inlet valve(s) 12 are controllable by one or more adjustable inlet camshafts 13. The exhaust valve(s) 14 are controllable by one or more adjustable exhaust camshafts 15.

A control device in the form of an engine electronic control unit or ECU 1 is signal connected to the fuel supply 20 and a camshaft adjuster 16 for adjusting the camshafts 13, 15, in order to control these components. The engine ECU 1 is additionally signal connected to the lambda jump or broadband probe 40 and receives an output signal $\lambda_{40}$ from the same.

Figure 2:
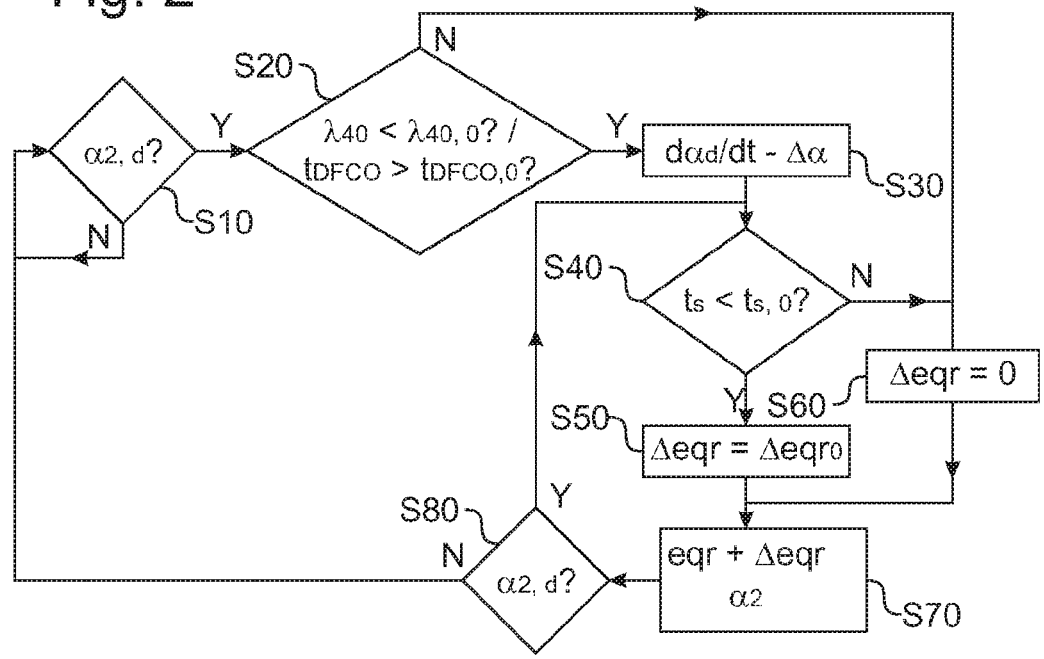
FIG. 2 illustrates a method for controlling the internal combustion engine according to the present disclosure.

The control device in the form of the engine ECU 1 carries out a method for controlling the internal combustion engine according to an embodiment of the present disclosure explained with reference to FIG. 2. In a step S10, the engine ECU 1 checks if a valve overlap, for example characterized by an adjusting angle of the camshaft adjuster 16, is to be increased, for example starting out from a current lower valve overlap value to an upper valve overlap value $\alpha_{2,d}$ that is dependent on a rotational rate and load (demand) of the internal combustion engine. For as long as this is not the case (S10: "N"), the engine ECU 1 repeats the step S10.

If the valve overlap is to be (temporarily) increased to an upper valve overlap value $\alpha_{2,d}$ (S10: "Y"), the engine ECU 1 in a step S20 determines the oxygen charge of the catalytic converter 30 or a charge value therefore. In an embodiment, the engine ECU 1 determines the oxygen charge or the charge value based on the output signal of the lambda jump or broadband probe 40. For example, a determined oxygen charge or charge value can be proportional to a reciprocal of an output voltage signal of the lambda jump or broadband probe 40, which for example below 200 mV can detect a high and/or above 600 mV a low oxygen charge.

In another embodiment, the engine ECU 1 in step S20 determines the oxygen charge of the catalytic converter 30 or the charge value therefor based on a duration $t_{DFCO}$ of an unfired or non-combusting overrunning operation of the internal combustion engine ("deceleration fuel cut-off") preceding the increasing of the valve overlap. In particular, a determined oxygen charge or charge value can be proportional to a duration of an unfired or non-combusting overrunning operation of the internal combustion engine. Then, the engine ECU 1 checks in step S20 if the determined oxygen charge or the determined charge value exceeds an adjustable limit value ($\lambda_{40} < \lambda_{40,0}$ or $1/\lambda_{40} > 1/\lambda_{40,0}$ or $t_{DFCO} > t_{DFCO,0}$).

If this is the case, (S20: "Y"), the engine ECU 1 in a step S30 reduces a rate $d\alpha_d/dt$ of the commanded increasing of the valve overlap for example a rate of the camshaft adjuster 16, by a preset offset $\Delta\alpha$. Additionally, the engine ECU 1 reduces in steps S40-S70 a (first) control value for increasing an air-fuel ratio. For a commencement phase of increasing of the valve overlap carried out in step S70 up to the expiration (S40: "N") of an adjustable period of time $t_{s,0}$, it always increases and EQR or fuel control value EQR by a preset offset $\Delta eqr_0 > 0$, so that the fuel supply 20 accordingly always supplies more fuel. The EQR or fuel control value EQR itself can be preset for example based on a load demand by the engine ECU 1 and/or a lambda control of the catalytic converter 30.

In a step S80, the engine ECU 1 checks if the temporary increasing of the oxygen charge of the catalytic converter 30 to the upper valve overlap value $\alpha_{2,d}$ continues to be commanded. If this is no longer the case (S80: "N"), the engine ECU 1 or the method returns to step S10. In the case that the determined oxygen charge or the determined charge value exceeds the adjustable limit value (S20: "N"), the engine ECU 1 or the method skips step S30, i.e. does not slow down the commanded increasing, and just as after the expiration (S40: "N") of the commencement phase also sets the offset $\Delta eqr_0$ to zero, so that as a consequence the (first) control value for increasing air-fuel ratio is also no longer reduced by the offset $\Delta eqr_0$ or conversely the EQR or fuel control value no longer increased by the offset $\Delta eqr_0$. By way of this, the air-fuel ratio following the commencement phase or preset period of time $t_{s,0}$ of the increasing of the valve overlap or provided the oxygen charge of the catalytic converter 30 does not exceed the limit value, is no longer reduced (commanded by a constant offset).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for controlling an internal combustion engine of a motor vehicle comprising:
    providing an engine controller, an engine having a cylinder with an inlet valve and an exhaust valve;
    determining an oxygen charge of a catalytic converter of the internal combustion engine, an valve overlap and an engine air-fuel ratio; and
    increasing a valve overlap phase in which an inlet valve and an exhaust valve of a cylinder of the internal combustion engine are opened at a rate of change from a lower valve overlap value to an upper valve overlap value based on the oxygen charge of the catalytic converter; and
    adjusting a control value as a function of the determined oxygen charge for at least one phase when increasing the valve overlap to increase the amount of oxygen within a catalytic converter thereby increasing a reduction of at least one of nitrogen oxides ($NO_x$), carbon monoxide (CO), and hydrocarbons ($H_mC_n$) within an exhaust stream passing through the catalytic converter, wherein the control value is associated with at least one of the valve overlap or the engine air-fuel ratio in the cylinder of the internal combustion engine.

2. The method according to claim 1, further comprising:
    controlling the internal combustion engine to provide a first determined oxygen charge such that the upper valve overlap value has a first overlap value; and
    controlling the internal combustion engine to provide a second determined oxygen charge which is greater than the first determined oxygen charge such that the upper valve overlap value has a second overlap value which is smaller than the first overlap value.

3. The method according to claim 1, further comprising controlling the internal combustion engine for a first determined oxygen charge such that the control value for the phase has a first ratio control value; and
    controlling the internal combustion engine for a second determined oxygen charge which is greater than the first determined oxygen charge such that the control value for the phase has a second ratio control value which is smaller than the first ratio control value.

4. The method according to claim 1, further comprising controlling the internal combustion engine for a first determined oxygen charge such that the rate of change has a first rate value; and
    controlling the internal combustion engine for a second determined oxygen charge which is greater than the first determined oxygen charge such that the rate of change has a second rate value which is smaller than the first rate value.

5. The method according to claim 1 further comprising:
    controlling the internal combustion engine for a first determined oxygen charge such that the upper valve overlap value has a first overlap value, the control value has a first ratio control value and the rate of change has a first rate valve; and
    controlling the internal combustion engine for a second determined oxygen charge, which is greater than the first determined oxygen charge, such that the upper valve overlap has a second overlap value which is smaller than the first overlap value, the control value for the phase has a second ratio control value which is smaller than the first ratio control value, and the rate of change has a second rate value which is smaller than the first rate value.

6. The method according to claim 1, further comprising:
    controlling the internal combustion engine for the phase such that the upper valve overlap value has a first overlap value when the determined oxygen charge does not exceed a preset limit value; and
    controlling the internal combustion engine for the phase such that the upper valve overlap value has a second overlap value which is smaller than the first overlap value when the determined oxygen charge exceeds the limit value.

7. The method according to claim 1, further comprising:
    controlling the internal combustion engine for the phase such that the control value has a first ratio control value when the determined oxygen charge does not exceed a preset limit value; and
    controlling the internal combustion engine for the phase such that the control value has a second ratio control value which is smaller than the first ratio control value when the determined oxygen charge exceeds the limit value.

8. The method according to claim 1, further comprising:
    controlling the internal combustion engine for the phase such that the rate of change a first rate value when the determined oxygen charge does not exceed a preset limit value; and
    controlling the internal combustion engine for the phase such that the rate of change has a second rate value, which is smaller than the first rate value when the determined oxygen charge exceeds the limit value.

9. The method according to claim 1, further comprising:
    controlling the internal combustion engine for the phase such that the upper valve overlap value has a first overlap value, the control value has a first ratio control value and the rate of change a first rate value when the determined oxygen charge does not exceed a preset limit value; and
    controlling the internal combustion engine for the phase such that the upper valve overlap value has a second overlap value which is smaller than the first overlap value, the control value has a second ratio control value which is smaller than the first ratio control value and the rate of change has a second rate value, which is smaller than the first rate value when the determined oxygen charge exceeds the limit value.

10. The method according to claim 1, further comprising increasing the valve overlap by a variable preset value.

11. The method according to claim 1, further comprising adjusting the control value by a variable preset value.

12. The method according to claim 1 further comprising determining the oxygen charge as a function of a duration of an unfired overrunning operation of the internal combustion engine.

13. The method according to claim 1, wherein determining the oxygen charge comprising measuring the oxygen charge with at least one sensor arranged downstream of the catalytic converter.

14. The method according to claim 1, wherein adjusting the control value comprises increasing a fuel control value for increasing a fuel supply.

15. A non-transitory computer-readable medium comprising a program code having instruction which when executed on a processor carrying out the method according to claim 1.

* * * * *